June 22, 1965 C. E. TAYLOR ETAL 3,190,315
HOSE
Filed Sept. 10, 1962
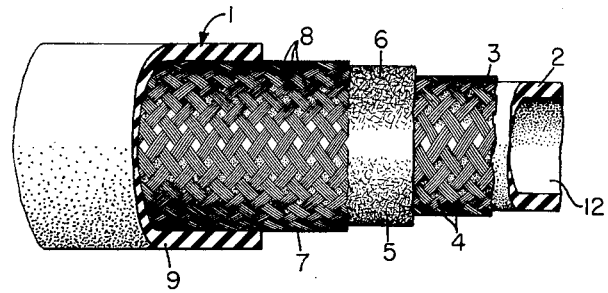
FIG. 1
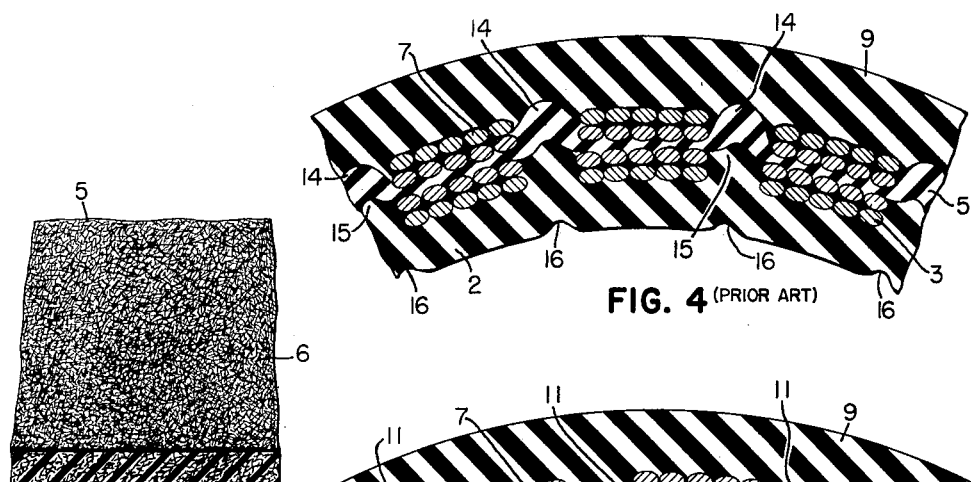
FIG. 2
FIG. 4 (PRIOR ART)
FIG. 3
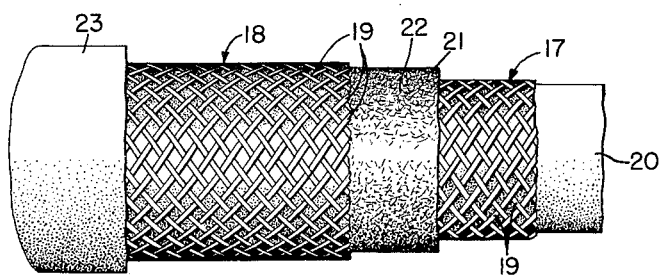
FIG. 5
INVENTORS
WINN I. HARKLEROAD
BY PAUL I. PUDDINGTON
CHALLEN E. TAYLOR
J. B. Holden
ATTORNEY

United States Patent Office 3,190,315
Patented June 22, 1965

3,190,315
HOSE
Challen E. Taylor and Paul I. Puddington, Waukegan, and Winn I. Harkleroad, Mundelein, Ill., assignors to The Goodyear Tire & Rubber Company, Akron, Ohio, a corporation of Ohio
Filed Sept. 10, 1962, Ser. No. 223,297
2 Claims. (Cl. 138—127)

This application is a continuation-in-part of our application, Serial No. 190,272, filed the 26th day of April 1962, now abandoned.

This invention relates to a flexible tubular structure and more particularly to a hose for transmitting fluids under pressure.

The technological advances in manufacturing and material handling processes have required improved or increased physical characteristics of the equipment used therewith and in many instances the development of new types and new constructions was necessary. In hose, the requisite physical properties, such as burst, flexibility, elongation, fatigue life, etc. have reached limits that were considered impossible not too many years ago. As a result, many modifications and new techniques are being developed to meet these increased requirements.

A particular problem encountered in hose which is subjected to relatively high pressures and flexing is to prevent the reinforcement layers from contacting each other during the expansion and contraction introduced by the operating conditions. It is also desirable to eliminate or reduce the relative movement of the reinforcing layers when subjected to pulsating loads caused by the operating pressure conditions. The movement of the elements forming the reinforcement layers particularly if the layers are in contact with each other, introduces rapid degradation of the elements and results in premature failure. It has been found that by preventing during vulcanization, any substantial flow of the layer of elastomer material between the reinforcing layers, adequate protection is provided for the elements of the reinforcing layers. Also, the position of the layers is much more accurately controlled in the finished product and localized stress areas are eliminated. As a result, the hose is inherently more uniform and of higher quality throughout. It is, therefore, an object of this invention to provide an improved hose construction with an improved service life.

Another object of the invention is to provide a hose structure that is more uniform in structural characteristics throughout its length.

A still further object of this invention is to provide a hose structure that requires little, if any, change in the method of fabrication.

These and other objects and advantages of this invention will become apparent hereinafter as the description thereof proceeds, the novel features, arrangements and combinations being clearly pointed out in the specification as well as the claims thereunto appended.

In the drawings:

FIG. 1 is an elevation of a section of a typical hose construction with portions broken away;

FIG. 2 is an enlarged fragmentary section of a portion of the invention;

FIG. 3 is a similar enlarged partial section of a hose constructed in accordance with the present invention;

FIG. 4 is an enlarged partial section of a typical prior art hose construction illustrating material flow in a typical hose construction during vulcanization; and FIG. 5 is an elevation of a section of another typical hose construction with portions broken away.

In FIG. 1 a typical high pressure hose 1 having an inner tubular member 2 of elastomer material impervious to the fluids passing therethrough is surrounded by a reinforcing layer 3 which, as illustrated, is of a braided construction. The layer 3 is braided from bands or ribbons having a plurality of individual strands or elements 4 lying in a side by side position. The elements 4 forming the braided reinforcing layer 3 may be of wire or a textile material such as nylon, rayon, Dacron, etc., depending upon the particular physical requirements of the hose.

Surrounding the reinforcement layer 3 is an insulation layer 5 of elastomer material which includes short lengths of filaments 6 randomly dispersed throughout as best seen in FIG. 2. The filaments 6 may be of any flexible material, such as textile, metallic, glass, plastic, cellulosic, ceramic, etc. and are formed preferably from short lengths of fibres, strands, monofilaments, yarns, etc. of the aforementioned materials. The filaments 6 are uniformly but randomly dispersed throughout the elastomer material of layer 5 prior to incorporating it into the hose structure. Short lengths of staple fibres of natural or synthetic textile material, such as cotton, rayon, nylon or Dacron have been found to be particularly suitable for this purpose.

Surrounding the layer 5 is a second reinforcement layer 7 similar to reinforcement layer 3 and as shown is of a braided construction of elements 8 similar to those of layer 3. Encasing the braided layer 7 is, as illustrated, a cover 9 of elastomer material, though this material may be of any desired material and serves to protect the reinforcement layer 7 from abrasion and damage in service. The entire composite structure of the hose 1 after forming is then subjected to heat and pressure to unite the various elements into an integral and unitary structure in accordance with any of the usual well-known methods.

In one of the widely used methods of vulcanization the exterior of the hose 1 in the vulcanizing operation is completely confined, usually by a lead jacket and the interior 12 of the hose is subjected to substantial pressure. Due to the pressure applied to the interior 12 of the hose combined with the softening introduced by the elevated temperatures during vulcanizing the material flows to fill the interstices in the reinforcement layers, such flow normally being radially outward.

A substantial portion of the insulation layer 5 flows during vulcanization to fill the interstices of the reinforcement layers 3 and 7. As a result, the thickness of the insulation layer 5 is substantially reduced and in some instances actual contact is made by reinforcement layers 3 and 7 and the uniform stresses introduced therein during braiding are destroyed. In addition, concentrated stress areas are formed because of the non-uniform flow of the insulation layer during vulcanization. Contact of the reinforcement layers and concentrated stress areas as well as the non-uniform stresses in the elements of the reinforcement layers materially reduce the useful life of the hose when in use it is subjected to the pressure changes of the fluid passing through thus causing expansion and contraction of the hose.

FIG. 3 illustrates the results obtained by the use of the randomly dispersed short filament lengths 6 of textile material throughout the elastomer material of the insulation layer 5 which lies between the reinforcement layers 3 and 7 of the hose 1. Any substantial flow of layer 5 is prevented during vulcanization due to the increased resistance of the material of layer 5 to flow under the pressure and temperature conditions of vulcanization. As a result, the interstices in the reinforcement layers 3 and 7, as seen at 10 and 11 respectively, are filled by the flow of non-critical elements of the hose such as the tubular member 2 and cover layer 9. Thus, the reinforcement layers 3 and 7 are not displaced which during vulcanization eliminates contact between them and concentrated stress areas as well as retaining uniform stresses in the elements of the reinforcement members.

In FIG. 4 the insulation layer 5 of elastomer material between reinforcement layers 3 and 7 does not include the randomly dispersed short filament length 6 and, as a result, has flowed out into the interstices between the members of the braided layer 7 as indicated by the numeral 14. Correspondingly, portions of the inner tubular member 2 have flowed considerably outwardly as indicated by the numeral 15 into the interstices of the reinforcement layer 3. This flow causes relatively large concentrated stress areas 16 in the inner tubular member 2 and areas from which rupture of the tubular member 2 will readily begin as well as a reduced thickness (exaggerated) of insulating layer 5.

In FIG. 5 another typical hose construction is illustrated in which the reinforcement layers 17 and 18 are formed of a braid of single strands 19 of material. In this particular construction the inner tubular member 20 is surrounded by the spaced reinforcement layers 17 and 18 separated by layer 21 of elastomer material having the randomly dispersed filaments 22 of textile material therein. The cover 23 encases the outer reinforcement layer 18 in a manner similar to that described in connection with FIG. 1.

The teachings of this invention are applicable to many types of hose construction. The materials used and the methods of fabrication for the various hose constructions may be selected to provide the maximum results for the intended use of the hose and in many instances a greater number of layers will be used in the hose construction. The insulating layer having the randomly dispersed fibres therein is applied in the usual manner in lieu of the normal insulating layer of elastomer material without the fibres incorporated therein. It may be used throughout or selectively in hose constructions having a greater number of layers than those illustrated. No special handling or changes are required in the normal hose building techniques.

While certain representative embodiments and details have been shown for the purpose of illustrating the invention, it will be apparent to those skilled in the art that various changes and modifications may be made therein without departing from the spirit or scope of the invention.

Having thus fully described our invention what we claim and desire to secure by Letters Patent of the United States is:

1. In a hose structure for carrying fluids under pressure which includes an inner layer of elastomer material, a pair of spaced reinforcing layers as strength members therein with each layer having interstices therein between the elements forming the reinforcing layers and an outer covering layer of elastomer material, the improvement comprising a layer of elastomer material between said reinforcing layers and having a multitude of lengths of staple textile fibres randomly disposed throughout the material of said layer to substantially prevent flow of said layer during vulcanization whereby the reinforcing layers are prevented from contacting each other when subjected to flexing and pressure during use, the interstices being filled by vulcanized integral extensions of said inner layer and outer covering layer.

2. A vulcanized integral hose structure for carrying fluids under high pressure including a fluid-impervious inner layer of elastomeric material, a reinforcing layer surrounding and intimately engaging said inner layer, a layer of elastomer material encasing said reinforcing layer, said elastomer material having a multitude of lengths of short filaments of flexible material extending in random disposition throughout said layer whereby substantial flow of said layer during vulcanization is prevented, a second reinforcing layer surrounding said layer of elastomer material, each of said reinforcing layers being braided of strands of flexible metallic material with interstices between the strands forming the braided layer, and a cover encasing said structure, the interstices being filled by vulcanized integral extensions of said inner layer and cover.

References Cited by the Examiner

UNITED STATES PATENTS

| | | |
|---|---|---|
| 2,564,602 | 8/51 | Hurst _____ 138—125 |
| 2,577,049 | 12/51 | Uline _____ 138—127 XR |
| 2,614,058 | 10/52 | Francis. |
| 2,783,173 | 2/57 | Walker et al. |
| 2,793,130 | 5/57 | Shannon et al. |
| 2,800,145 | 7/57 | Peierls et al. _____ 138—125 XR |
| 2,803,043 | 8/57 | Stephens. |
| 2,829,671 | 4/58 | Ernst et al. _____ 138—127 XR |
| 2,965,151 | 12/60 | Elliott et al. _____ 138—125 XR |

EDWARD V. BENHAM, *Primary Examiner.*

LEWIS J. LENNY, *Examiner.*